June 6, 1944.   H. M. STUELAND   2,350,701
RETRACTABLE SPUD SUPPORT
Filed Feb. 25, 1943   2 Sheets-Sheet 1

INVENTOR
HAROLD M. STUELAND
BY
ATTORNEYS

June 6, 1944.     H. M. STUELAND     2,350,701
RETRACTABLE SPUD SUPPORT
Filed Feb. 25, 1943     2 Sheets-Sheet 2
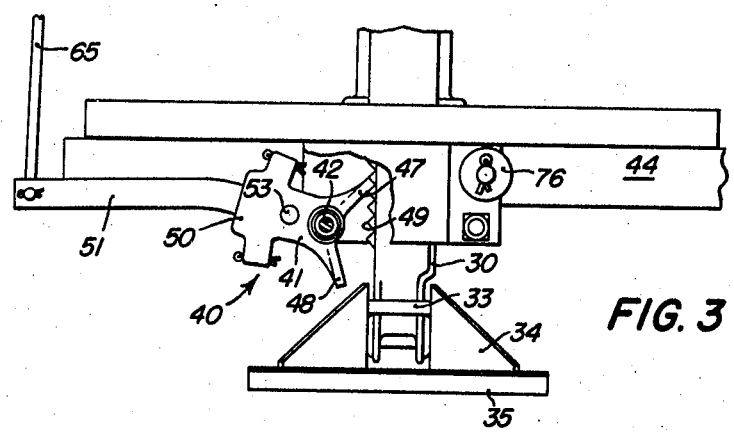
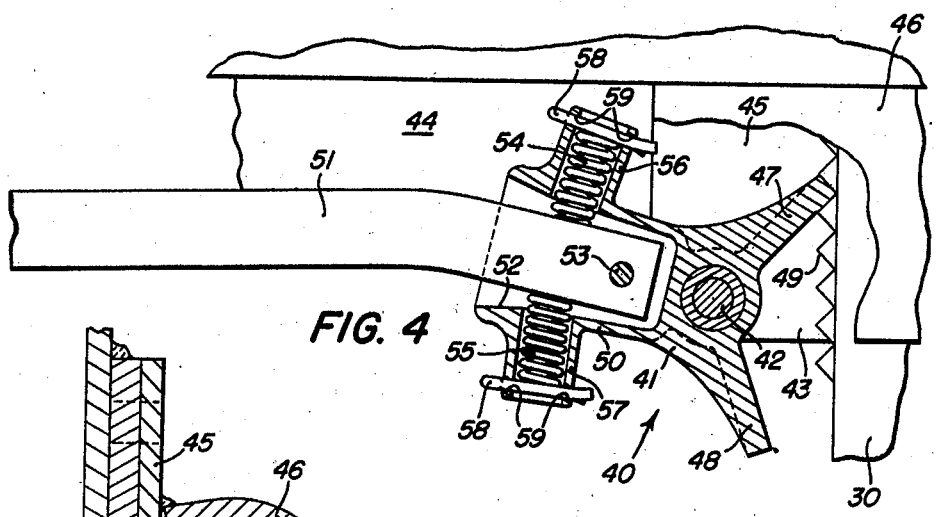
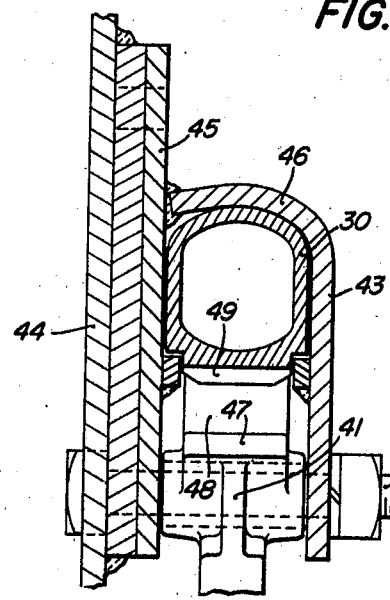
INVENTOR
HAROLD M. STUELAND
BY
ATTORNEYS Patented June 6, 1944

2,350,701

UNITED STATES PATENT OFFICE 2,350,701

RETRACTABLE SPUD SUPPORT

Harold M. Stueland, East Moline, Ill., assignor to Deere & Company, Moline, Ill., a corporation of Illinois Application February 25, 1943, Serial No. 477,179

10 Claims. (Cl. 212—38)

The present invention relates generally to retractable supports and more particularly to supports of the type employed in connection with portable hoists in which the load is applied to a framework which overhangs the mobile frame, with particular reference to detachable hoists for tractors. A hoist of this type is shown in Patent No. 2,298,199, granted October 6, 1942, to Court and Stueland, and the present invention is in the nature of an improvement over the device shown and claimed in said patent.

With the structure shown in the above patent, it is necessary to connect the spud to the hoist boom and raise the spud by lifting the boom, whenever it is necessary to move the hoist from one operating location to another. The principal object of the present invention relates to the provision of a spud which is conveniently controlled from the operator's station, but which requires no connection to the hoist boom or other time consuming operation, when it is desired to move the hoist to another location.

According to the present invention, the spud is in the form of a ground engageable shoe having a runner which is adapted to slide along the surface of the ground and is provided with a reversible clutching means, such as a reversible ratchet device, under convenient control of the operator, which can be set to permit downward movement of the spud while preventing upward movement of the spud, or vice versa. When the ratchet mechanism is set so that the spud is permitted to move downwardly but restrained against upward movement, the spud acts as a support and carries the greater part of the load of the hoist directly upon the ground, and in soft ground the ratchet mechanism permits the spud to work downwardly as the ground yields, thereby maintaining the load supporting function of the spud. When the ratchet mechanism is reversed, the hoist can be readily moved from one location to another, the ground engageable shoe merely sliding along the ground, but whenever the shoe encounters a raised spot in the ground, it is raised upwardly but is prevented from dropping again by the ratchet mechanism. Thus, it is only necessary for the operator to reverse the ratchet device, after which no further attention is necessary when transporting the hoist from one place to another, as the unevenness of the ground itself causes the spud to be jacked into a raised position. Then, when the new operating location is reached, the operator only needs to once more reverse the ratchet device and the spud drops to the ground and automatically jacks itself into load supporting relation to the hoist.

Another object of my invention relates to the provision of means for manually raising the spud to full transport position, combined with means for locking the boom against lateral swinging movement during transport.

These and other objects and advantages of my invention will be apparent to those skilled in the art after a consideration of the following description, in which reference is had to the drawings appended hereto, in which Figure 1 is a fragmentary side elevational view of a portable hoist mounted on a tractor, the near wheel of the tractor being removed to more clearly show the details of my invention;

Figure 3 is a rear elevational view showing the support in a retracted position, with a portion broken away to show the details of the ratchet mechanism;

Figure 4 is an enlarged elevational view showing a section through the ratchet mechanism; and Figure 5 is a fragmentary sectional view taken along a line 5—5 of Figure 2.

Figure 1:
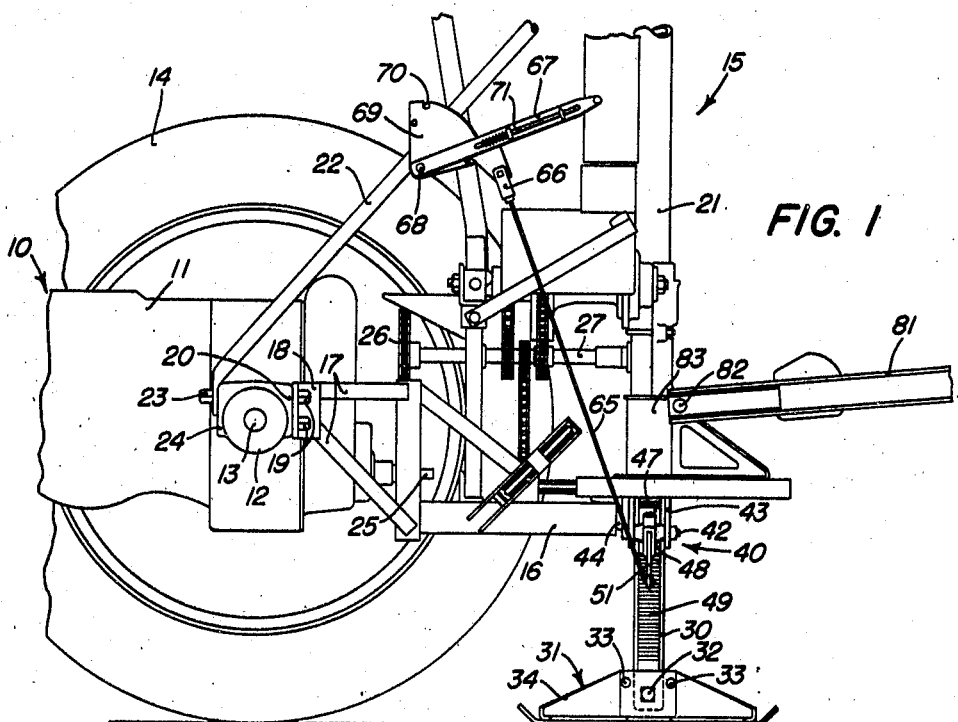

Referring now to the drawings, the portable hoist of this embodiment comprises a tractor indicated generally by reference numeral 10, which includes a longitudinally extending body 11 having a transversely disposed differential and axle housing 12, within which are journaled drive axles 13 carried on traction wheels 14, and a detachable hoist 15 mounted thereon.

The detachable hoist 15 comprises a framework 16 including supporting members 17 fixed to a bracket 18, which is secured by studs 19 to the appropriate implement supporting bosses 20 on the rear side of the axle housing 12. The hoist includes a mast 21, which is rigidly supported on the frame 16 in a substantially vertical position and is braced by means of suitable braces 22 extending downwardly and forwardly and are secured at their forward ends by suitable studs 23 engaging the conventional implement supporting bosses 24 on the forward side of the axle housing 12.

The tractor is provided with a conventional power take-off shaft 25, which drives the hoist mechanism through a suitable chain and sprocket mechanism 26 and through a central drive shaft 27 rotatably supported on the hoist frame 16. Inasmuch as the details of the hoist itself are not essential for understanding the principles of the present invention, it is not considered necessary to describe the hoist in detail. The above-mentioned patent contains a thorough description of a similar type of a similar tractor mounted hoist.

The mast 21 is in the form of a vertical pipe or tube, open at its lower end to receive the vertical standard 30 of a retractable spud support, which is telescopically disposed within the tubular mast 21, and is vertically slidable therein. The ground engageable shoe 31 is pivotally connected to the lower end of the standard 30 by means of a transversely disposed pivot bolt 32, providing for fore and aft tilting movement of the shoe 31 relative to the standard 30 about the transverse axis of the bolt 32. A pair of pins 33 are inserted through the shoe 31, which includes a pair of laterally spaced vertically disposed supporting webs 34. A runner 35 is secured as by welding to the bottoms of the webs 34 and is turned up at the front and rear ends to facilitate sliding along the surface of the ground. The pins 33 engage the front and rear sides of the standard 30, respectively, when the shoe is tilted in opposite directions about the bolt 32, to limit the extent of movement.

The retractable spud is retained against upward or downward movement relative to the mast 21 by means of ratchet mechanism, indicated generally by reference numeral 40, which will be described in detail. The ratchet mechanism 40 has a pawl member 41 which is pivotally mounted by means of a bolt 42 in a housing 43 fixed to a transverse angle member 44, the latter being supported on the rear of the hoist frame 16. The housing 43 comprises a flat plate member 45, serving as one wall, and a curved plate 46 serving as the side and rear walls thereof and welded to the plate 45 as best indicated in Figure 5. The standard 30 is substantially rectangular but has a curved side which fits slidably within the curved portion of the plate 46, and is therefore slidable vertically but is prevented from rotating about its vertical axis relative to the housing 43.

The pawl member 41 includes a pair of oppositely extending upper and lower dogs 47, 48, respectively, which can be engaged selectively with a rack 49 extending vertically along the side of the standard 30. The pawl member 41 also includes a hollow shank portion 50, extending radially outwardly from the pivot bolt 42 on the side opposite the dogs 47, 48. A handle 51 is disposed with one end inserted into the recess 52 in the shank 50 and is swingably secured therein by means of a pin 53 adjacent the end of the handle, and the recess 52 is somewhat larger than the handle, permitting the same to rock to a limited extent vertically about the axis of the pin 53. The handle 51 is retained in a substantially central position within the recess 52 by means of a pair of compression springs 54, 55 above and below the handle 51, respectively. The springs 54, 55 are disposed within tubular extensions 56, 57, respectively, formed in the shank 50 of the pawl member 41. The springs 54, 55 bear upon the upper and lower sides of the handle 51 and react against cotter pins 58, which are inserted transversely through suitable holes 59 in the ends of the tubular portions 56, 57.

Figure 2:
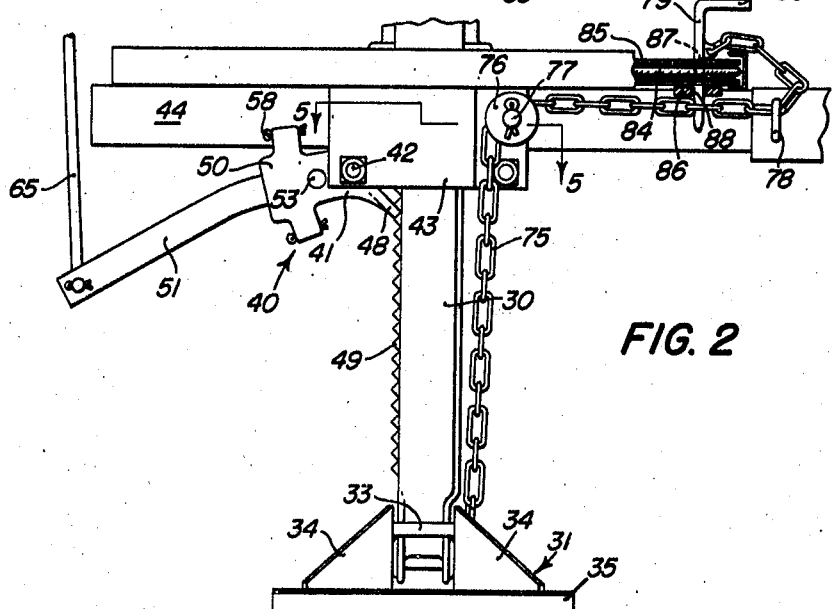
Figure 2 is a fragmentary rear elevational view, drawn to an enlarged scale, showing the details of construction of the retractable spud support.

The handle 51 is connected by means of a link 65 and clevis 66 (see Figure 1) to a manually operated lever 67, which is pivotally mounted on a bolt 68, supported on a sector 69, which is fixed to the diagonal brace 22. The sector 69 is provided with a pair of notches 70 in at least two locations on the sector, corresponding to the raised and lowered positions of the hand lever 67. The latter is provided with a latch device 71 adapted to engage the two notches 70 to retain the lever 67 in either of the two positions. In Figure 1, the lever is set in the lowered position, in which the ratchet handle 51 is maintained in a lower position wherein the downwardly extending dog 48 is presented in engagement with the rack 49. This is the normal operating position of the spud support, in which the dog 48 prevents upward movement of the standard 30, but permits downward movement of the latter, since the dog 48 can swing downwardly as the weight of the spud tends to carry the standard 30 downwardly. As the dog 48 swings the pawl member 41 in a clockwise direction as viewed in Figure 2, the lower spring 55 is compressed, exerting a force tending to return the dog 48 to engagement with the next higher tooth of the rack 49.

When the lever 67 is swung to its upper position, the handle 51 is raised to the position shown in Figures 3 and 4, in which the upper dog 47 is presented in contact with the teeth of the rack 49. This is the position in which the mechanism is set for purposes of transport, wherein the dog 47 prevents downward movement of the standard 30 but permits upward movement, causing the dog 47 to slide over the end of the rack tooth, swinging the pawl member 41 in a counterclockwise direction as viewed in Figure 4, and thus compressing the upper spring 54, which thereafter forces the dog 47 into a position beneath the adjacent tooth.

During operation of the hoist, the lever is set in its lower position as shown in Figure 1, in which the shoe 31 rests upon the ground. When load is imposed upon the hoist, the weight thereof tends to force the shoe downwardly and if the ground is slightly soft, the shoe will settle into the soil to some extent, since the pneumatic tires of the tractor wheels 14 are compressed to permit such downward movement. When the load is removed from the hoist, the tractor tires tend to raise the framework of the hoist slightly, but the spud remains in ground engaging position, resulting in an upward movement of the frame of the hoist relative to the spud. This causes the lower dog 48 to slide over the end of the tooth immediately thereabove and thereby cause the spud to take a greater portion of the load on the next loading of the hoist. In this manner, whenever the spud tends to settle into the ground, more load is imposed upon the tractor tires and therefore there is more upward movement of the hoist when the load is removed therefrom, causing an upward notching of the pawl member 41 on the rack 49. The pivotal action of the shoe 31 on its bolt 32, causes the shoe to bear substantially with uniform pressure on the ground, regardless of the slope of the latter.

When the operator desires to move the hoist to a different location, he merely disconnects the latch 71 from the lower notch 70 and pulls the lever 67 back to the upper notch 70, raising the handle 51 to its upper position as shown in Figures 3 and 4. While this does not raise the spud from the ground, the operator is now free to drive the tractor and move the hoist either forwardly or rearwardly, and the shoe 31 will slide along the ground. When the shoe encounters a bump or other obstruction on the ground, it is free to rise to clear such high spot, but the upper dog 47 will prevent the shoe from dropping to its previous location. Each protuberance in the surface of the ground which is encountered by the shoe will cause the support to be notched upwardly, and the standard 30 will always be retained at the highest position to which it is raised. When the hoist reaches its new location for operation, the operator merely throws the handle 67 downwardly once more and, without further attention to the spud, begins to operate the hoist, and the spud will again seek its load supporting position as described above.

If the operator desires to raise the spud to its maximum height for purposes of transport over long distances, he can do so by swinging the lever 67 to its upper notch 70 and then pulling the spud upwardly by means of a chain or other flexible member 75 connected to the shoe 31 and extending upwardly over a sheave 76, journaled on a pin 77, supported on the housing 43. The chain 75 extends from the sheave 76 through an eyebolt 78, fixed to the frame member 44 and is connected at its outer end to a pin 79 which has a handle 80 at one end thereof. The pin 79 serves as a handle by which to pull the chain 75 and also serves to lock the hoist boom 81 against lateral swinging during transport. The boom 81 is pivotally mounted on a pivot pin 82 on a sleeve member 83 encircling the lower portion of the mast 21 and is swung laterally during operation by means of suitable mechanism acting through a cable 84 wrapped around a sheave 85. The boom is locked by inserting the pin 79 downwardly through a suitable aperture 87 in the sheave 85 and through an aligned opening 88 in a lug 86 welded to the frame member 44.

I claim:

1. In a portable hoist, a mobile frame, a retractable support comprising a vertically adjustable standard, a ground engageable shoe having runner means providing for sliding movement of said shoe along the ground, and means for rockably attaching said shoe to the lower end of said standard.

2. In a portable hoist, a mobile frame, a mast supported thereon and offset at one side of said frame, a supporting standard telescopically related to said mast and adjustable vertically relative thereto, a ground engageable shoe having runner means providing for sliding movement of said shoe along the ground, and means for rockably attaching said shoe to the lower end of said standard.

3. In a portable hoist, a mobile frame, a mast supported thereon and offset at one side of said frame, a ground support for said mast comprising a standard shiftable vertically relative to said mast, a ground engaging member mounted on said standard and adapted to follow the contour of the ground when the frame advances, one-way clutching means for securing said standard and member against vertical movement in one direction while permitting vertical movement in the opposite direction, and means for optionally reversing the action of said clutching means, whereby during transport said ground support can be retained against dropping downwardly but is free to be moved upward when encountering a high spot in the ground and retained in the higher position, and upon reversal of said clutching means, said ground support can be retained against upward movement but permitted to drop to ground engaging position, thus supporting said mast and movable downwardly relative to said mast as said member settles into soft ground.

4. The combination set forth in claim 3 including the further provision of an operating lever mounted adjacent an operator's position on said frame, and linkage means connected with said reversing means for controlling the latter.

5. In a portable hoist, a mobile frame, a mast supported thereon and offset at one side of said frame, a ground support for said mast comprising a standard shiftable vertically relative to said mast, a ground engageable shoe rockably mounted on said standard and having upwardly turned runner means adapted to follow the contour of the ground when the frame advances, one-way clutching means for securing said standard and member against vertical movement in one direction while permitting vertical movement in the opposite direction, and means for optionally reversing the action of said clutching means, whereby during transport said ground support can be retained against dropping downwardly but is free to be moved upward when encountering a high spot in the ground and retained in the higher position, and upon reversal of said clutching means, said ground support can be retained against upward movement but permitted to drop to ground engaging position, thus supporting said mast and movable downwardly relative to said mast as said member settles into soft ground.

6. The combination set forth in claim 5, characterized further in that said one-way clutching means comprises a cooperative rack and pawl device mounted on said support and frame, said pawl being pivotally supported and including opposed dogs engageable with said rack and a control lever for adjusting said pawl to present either of said dogs to engagement with said rack.

7. For use in a portable hoist or the like having a frame, a retractable support comprising a standard shiftable vertically relative to said frame, a ground engageable member mounted on the lower end thereof, a rack on said standard, a pawl member pivotally mounted on said frame and having a pair of opposed dogs adapted to be moved alternatively into engagement with said rack by pivoting said pawl member, a control handle pivotally connected to said member about an axis substantially parallel to said pawl pivot axis, and a pair of springs acting in opposite directions against said handle and anchored to said pawl member.

8. The combination set forth in claim 7 including the further provision of a control lever mounted in a remote position adjacent an operator's station, means for fixing said lever in adjusted position, and link means connecting said control lever with said pivoted handle to hold the latter in either of two positions whereby said pawl member can be retained to present either dog in engagement with said rack, selectively.

9. In a portable hoist, a mobile frame, a generally vertical mast supported thereon, a ground engageable support for said mast telescopically related thereto and shiftable vertically between ground engaging and transport positions, a flexible member connected to said support and serving as means by which the latter can be raised, a boom supporting member rotatable about the vertical axis of said mast, and a locking element for securing said boom supporting member against rotation during transport and attached to the end of said flexible member.

10. For use in a portable hoist or the like having a frame, a retractable support comprising a standard shiftable vertically relative to said frame, a ground engageable member mounted on the lower end thereof, a rack on said standard, a pawl member pivotally mounted on said frame and having a pair of opposed dogs adapted to be moved alternatively into engagement with said rack by pivoting said pawl member, a control handle pivotally connected to said member about an axis substantially parallel to said pawl pivot axis, a pair of springs acting in opposite directions against said handle and anchored to said pawl member, and means for securing said handle in positions in which either one or the other of said springs is compressed to urge the respective dog into rack engaging position.

HAROLD M. STUELAND.